Figure 1:
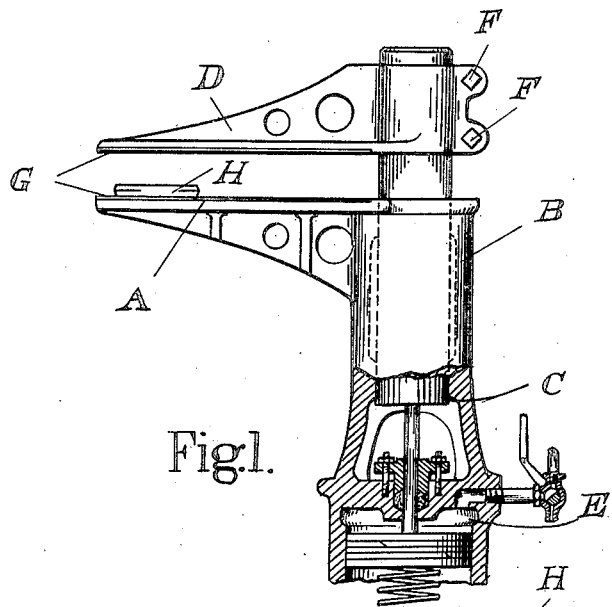

D. N. PRIME.
COUTTING APPARATUS.
APPLICATION FILED SEPT. 16, 1907.

1,075,064.

Patented Oct. 7, 1913.

WITNESSES.
Elizabeth C. Coupe
Edith C. Holbrook

INVENTOR.
Daniel N. Prime

UNITED STATES PATENT OFFICE.

DANIEL N. PRIME, OF LYNN, MASSACHUSETTS, ASSIGNOR TO UNITED SHOE MACHINERY COMPANY, OF PATERSON, NEW JERSEY, A CORPORATION OF NEW JERSEY.

CUTTING APPARATUS.

1,075,064.

Specification of Letters Patent.

Patented Oct. 7, 1913.

Application filed September 16, 1907. Serial No. 393,195.

*To all whom it may concern:*

Be it known that I, DANIEL N. PRIME, a citizen of the United States, residing at Lynn, in the county of Essex and Commonwealth of Massachusetts, have invented certain Improvements in Cutting Apparatus, of which the following description, in connection with the accompanying drawings, is a specification, like reference characters on the drawings indicating like parts in the several figures.

This invention relates to apparatus for cutting sheet material and particularly to mechanism for use in dieing out articles such as pieces of shoe stock from leather or other material employed in the manufacture of boots and shoes.

Apparatus of the general type to which this invention relates is discussed at length in Letters Patent of the United States No. 921,503, granted on application of Arthur Bates, May 11, 1909, to which reference may be had.

Hitherto it has been the practice in machines of this character to employ a die having a sharp cutting edge coacting with a die block of comparatively soft material, such as wood. Such dies especially if comparatively heavy are liable to mar or scratch the surface of the stock when being moved about thereover. Moreover the necessity for employing a die block of comparatively soft material in order to avoid dulling the cutting edges of the dies has some disadvantages, among which are the frequent resurfacing required to keep the block smooth and the liability of the edges of the material being carried into the block during the die cutting operation, especially when operating upon certain classes of material.

These objections it is the object of the present invention to obviate and to that end the invention contemplates the employment of a cutting die having a blunt or dull cutting edge.

As above suggested it is desirable to avoid the necessity for employing a die block of comparatively soft material, and inasmuch as a block of this character is not needed with a die having a blunt or dull cutting edge it is preferable that the dies be used in connection with a die block of hard metal. Moreover it has been found that this combination gives the desired results so far as cleanness of cut is concerned.

As shown, the die is reversible and is adapted to be forced through the work in the dieing out operation by means of a presser block which is preferably also of hard metal, and an important feature of the invention consists in the combination with a hard metal die block or cutting bed and a reversible cutting tool or die, of a presser block or die engaging member having a hard metal acting face for engaging one edge of the die to force the other edge of the die into the stock upon the die block. Making the die reversible renders it possible to utilize the same die for cutting out corresponding parts for both right and left shoes, thus greatly reducing the expense of a set of dies for the machine, and the blunt or dull cutting edge will not be injured by contact with the presser block or die bed in the operation of the machine.

Referring to the accompanying drawings which illustrate a preferred embodiment of my invention and in which—

Figure 2:
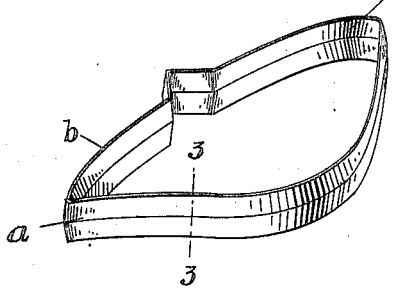
Figure 3:
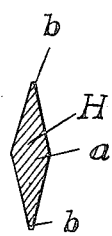

Figure 1 is an elevation, partly broken away, showing said invention as applied to a press for dieing out stock; Fig. 2 is a perspective view of the die; and Fig. 3 is a cross section of the die taken on the line 3—3 of Fig. 2.

A, represents the die bed of any ordinary form of clicking press, and comprises a broad surface against which the die acts. This bed is formed integral with or secured in any preferred way to a hollow post B through which passes rod C which supports and actuates the presser block D and which is actuated by any preferred mechanism in a vertical direction, as by means of a fluid operated motor E. Presser member D has a flat pressing surface and projects radially from rod C, being formed integral with said rod or secured thereto in any convenient or well known manner. As shown, the rear end of the presser member is split and clamped around rod C, being held in position thereon by clamping screws F. The presser member and die bed preferably are each provided with a facing G of a metal which is hard as opposed to soft metals, such as lead, which would tend to become roughened under the action of the dies. For instance, a casing of hardened steel may be applied to a presser member and cutting bed of cast iron, or other hard metals may be substituted for the hardened steel or the presser member and die block may be formed entirely of such hard metal.

The die H is of any convenient form corresponding to the shape it is desired to cut out. In dieing out pieces which are to be used in the manufacture of boots and shoes, and in which it is desired to provide corresponding pieces in rights and lefts, said pieces being the same size and of the same shape, except for this division in rights and lefts, great economy in the number of dies required for fitting out a machine is effected by making the dies reversible so that the same die which in one position is adapted to cut out a piece for a right shoe may, by being turned over, be adapted for use in dieing out the corresponding piece for a left shoe. For this reason I prefer to make the die reversible and to provide it with two similar cutting edges, one above and one below. Such a die is shown in perspective in Fig. 2 and in section in Fig. 3 and consists of a band like member thickened at its middle $a$ for the sake of strength and terminating above and below in cutting edges $b$ which are dull or blunt and which co-act with the hardened surfaces of the presser member D and the die bed A.

In operation the stock to be died out is supported upon the die block or cutting bed A, and the die H is placed in proper position on said work for dieing out as desired. Presser member D, which may be moved radially with rod C upon the axis of said rod C as fully explained in the patent above mentioned, is swung around into position over the die and is depressed through actuating means E, bringing hardened surface G into contact with the upper edge of die H, and forcing the lower edge of said die through the stock until said lower edge is in contact with the hardened surface of die bed A. This cuts out a piece of the exact shape of the die and the presser member D is then elevated in order that the died out piece may be removed and the die turned over if desired and placed in position on the stock to die out another piece.

Having described my invention, what I claim as new and desire to secure by Letters Patent of the United States is:—

1. In a machine of the class described, the combination of a double edge cutting die, a presser plate arranged to engage one edge of said die and force the other edge through stock, and a die block of approximately the same degree of hardness as said cutting die.

2. A reversible cutting die in combination with a die block and a presser block of approximately the same hardness as said die, said presser block being arranged to engage one cutting edge of said die and force the other through stock supported on said block.

3. A reversible cutting die having blunt cutting edges in combination with a die block and a die engaging member of approximately the same hardness as said die.

4. The combination with a die block of hard metal and a reversible cutting die, of a presser block of hard metal arranged to engage one cutting edge of the die to force the other edge through stock upon the die block.

5. The combination with a die block of hard metal and a reversible die having blunt cutting edges upon its opposite sides, of a die engaging member of hard metal arranged to engage the cutting edge on one side of the die for forcing the cutting edge on the other side of the die through stock on the die block.

6. The combination with a die block, of a reversible loose cutting die having blunt cutting edges, and a presser block constructed and arranged to act upon one of said edges to force the other of said edges through the work.

7. The combination with a die block, of a reversible loose die having blunt edges, and a presser block constructed and arranged to act upon one of said edges to force the other of said edges through the work, said die block being of approximately the same hardness as said die.

8. The combination with a die block, of a reversible loose die having blunt cutting edges, and a presser block constructed and arranged to act upon one of said edges to force the other of said edges through the work, said presser block being of approximately the same hardness as said die.

9. The combination with a die block, of a reversible die having blunt cutting edges, and a die engaging member constructed and arranged to act upon one of said edges to force the other of said edges through the work, said die block and presser block being both of approximately the same hardness as said die.

10. The combination with a die block of hardened metal and a reversible die having blunt cutting edges which lie in parallel planes, of a die engaging member of hard metal having a plane working face, said die engaging member being arranged to be moved toward the die to cause its working face to engage the cutting edge on one side of the die for forcing the cutting edge on the other side of the die through stock supported on the die block.

In testimony whereof I have signed my name to this specification in the presence of two subscribing witnesses.

DANIEL N. PRIME.

Witnesses:
CHARLES E. GRUSH,
ARTHUR L. RUSSELL.